July 30, 1963

W. E. FOLKERTS 3,099,188

POWER STEERING GEAR

Filed Dec. 29, 1959

INVENTOR.
Walter E. Folkerts
BY
Harness & Harris
ATTORNEYS.

July 30, 1963  W. E. FOLKERTS  3,099,188
POWER STEERING GEAR
Filed Dec. 29, 1959  4 Sheets-Sheet 2

INVENTOR.
Walter E. Folkerts.
BY Harness & Harris
ATTORNEYS

July 30, 1963

W. E. FOLKERTS

3,099,188

POWER STEERING GEAR

Filed Dec. 29, 1959

INVENTOR.
Walter E. Folkerts.
BY Harness & Harris
ATTORNEYS.

United States Patent Office 3,099,188
Patented July 30, 1963

3,099,188
POWER STEERING GEAR
Walter E. Folkerts, Hazel Park, Mich., assignor to Chrysler Corporation, Highland Park, Mich., a corporation of Delaware
Filed Dec. 29, 1959, Ser. No. 862,566
20 Claims. (Cl. 91—374)

This invention relates to power steering and in particular to a steering mechanism for an automotive vehicle wherein the steering ratio varies from a comparatively high ratio to a comparatively low ratio as the mechanism moves in either direction from the straight-ahead steering condition.

An important object is to provide such a mechanism which is especially adapted for use with a torsion rod interconnecting a manually or personally rotatable steering shaft and a power driven rotatable shaft to effect a reaction force for the manually rotatable shaft proportional to the road resistance to the steering movement, yet which is particularly compact and simple in construction and efficient in operation.

Another object is to provide such a structure having an improved, compact, yet economically manufactured and highly efficient fluid actuated servo means of the follow-up type to actuate the rotatable power driven shaft.

Another and more specific object is to provide such a structure including a mutually supporting assembly of telescoping parts comprising a piston reciprocable in a cylinder and connected with a gear rack to reciprocate the same axially of the cylinder, a worm shaft, and a torsion rod arranged coaxially with the aforesaid manually rotatable shaft, the assembly comprising an improved, simplified lost motion connection between the worm shaft and manually rotatable shaft effective to actuate a slide valve in a pressurized fluid circuit for selectively energizing the piston.

Another object is to provide a worm shaft having a coaxial tubular extension directed away from the piston and containing a tubular slide valve and a torsion rod arranged coaxially therein and keyed to the worm extension to rotate therewith, the torsion rod extending within the tubular valve and having an enlarged slotted flattened end extending through diametrically spaced slots in the slide valve. A pin extending diametrically through the slot in said end of the torsion rod keys the latter to the manually rotatable shaft for rotation therewith to achieve a resilient reaction to turning of the latter shaft relative to the worm shaft, the slots in the slide valve enabling said relative turning of the shafs and pin without rotating the slide valve.

Another object is to provide such a structure wherein the diametrically extending pin projects radially into a lost motion slot in the tubular extension of the worm shaft, whereby limited relative turning of the manually rotatable shaft is enabled until the pin engages the tubular shaft extension. Thereafter, in the event that actuation of the slide valve fails to energize the piston and rotate the worm shaft to augment the manual steering movement, a direct manual driving engagement between the manually rotatable shaft and worm shaft is obtained.

Another object is to provide an improved compact steering gear wherein fluid reaction chambers in the side walls of the tubular worm shaft extension operatively engage an extension of said pin to resist its relative turning movement with a force proportional to the fluid force driving said piston throughout the limits of said rotative movement enabled by said lost motion slot.

Still other objects are to provide an improved valve construction comprising a ported valve sleeve fitted snugly into said tubular worm shaft extension and communicating with a plurality of radial fluid passages in the sidewalls of the worm shaft extension; and to provide an improved method of manufacturing such a valve wherein each port in said sleeve is formed by cutting a plurality of circumferentially extending windows therein by means of a rotating cutter disc having a width equal to the desired axial width of the windows, each window being cut to a circumferential extent greater than the circumferential spacing between the corresponding radial passages in the tubular worm shaft extension to assure alignment between the sleeve ports and passages regardless of the relative angular position of the sleeve.

Still another object is to provide improved valve actuating means comprising a tubular actuator rotatably supported within the tubular manually rotatable shaft and having a radially enlarged portion formed with a helical ball guide track. An opening in the sidewall of the manually rotatable shaft carries a ball which is maintained in seated position on the helical track by means of a grooved roller radially outward of the ball and having the latter confined within the groove of the roller. The sidewall opening in the manually rotatable shaft is formed cylindrically at diametrically opposite sides of the ball to provide bearing contact therewith, and is relieved between the cylindrical portions so as to avoid contact with the ball and minimize frictional resistance to its rolling movement.

The roller is confined circumferentially with respect to the manually rotatable shaft by means of a tubular housing secured to the latter and having radially extending grooves at diametrically opposite sides of the ball. A spindle extends through the axis of rotation of the roller and into the grooves for confinement therein and is urged radially toward the ball by a coil spring which in turn urges the roller radially toward the ball to hold the same against the helical track. By virtue of the foregoing structure, an appreciably greater axial movement of the slide valve is obtained, for a given angular movement of the manually rotatable shaft, than is feasible with conventional valve actuating devices. Thus a greater overlap between juxtaposed sealing parts of the slide valve porting system is achieved with a corresponding reduction in valve leakage.

Other objects are to provide improved compact means for adjusting the slidable spool element of the slide valve to enable equalization of hydraulic feel back pressures in the fluid reaction chambers regardless of the direction of steering from the neutral or straight-ahead positioning and to provide such an adjustment means cooperable with a cam actuator for the valve spool, wherein the latter and adjustment means are arranged coaxially in mutually supporting relation within a tubular portion of the manually rotatable shaft.

Another object is to provide an improved adjustment means for the valve which is connected to the latter and is arranged coaxially within the tubular actuator. The adjustment means is accessible for adjustment at one end of the tubular manually rotatable shaft which is closed by a rotatable and axially shiftable fluid sealing adjusting plug. By forcing the plug axially into engagement with the adjustment means and thereafter rotating the plug, axial adjustment of the adjustment means and valve spool is readily accomplished. Otherwise the adjustment plug is maintained by fluid pressure within the tubular manually rotatable shaft at a location spaced axially from the adjustment means.

Another object is to provide a structure of the above character including a sleeve guide fixed with respect to a housing and sleeved over a tubular extension of the piston, which in turn contains the worm rotatably journalled therein, and also including an improved interconnection between the piston extension and worm comprising an outwardly directed tubular portion of the piston extension projecting radially from the axis of worm rotation into an enlargement of the cylinder for the piston, a worm follower being journalled in the radial projection and having an inner portion riding within the worm grooves, the follower being yieldingly urged radially inwardly by a spring washer to maintain the inner portion of the follower within the worm grooves during operation.

Another object is to provide an improved rockshaft mounting for a power steering gear comprising an axially adjustable wear washer supporting the rockshaft against axial movement in one direction, and resilient means urging the rockshaft in said direction against the wear washer. The rockshaft carries a sector gear pivoted therewith and having teeth meshed with the teeth of a gear rack carried by an extension of the piston which is in turn coupled with the worm shaft as aforesaid. The meshing teeth are tapered so as to bind more tightly upon continued movement of said rockshaft in said one axial direction. An adjusting nut supports the wear washer against movement in said one direction and is adjustable axially to provide the desired minimum initial play between the meshing teeth of the sector gear and gear rack. The composition of the wear washer is determined so that the latter will wear at a rate sufficient to compensate for wearing of the meshing teeth, thereby to maintain minimum play therebetween throughout the operating life of the gear.

Other objects are to provide axially spaced radial shoulders on the tubular extension of the worm shaft, the distant or endwise outward surfaces of the shoulders defining segments of a sphere centered on the axis of rotation of the worm, and to support the spherical segments by tangential bearing means carried by a relatively fixed housing, whereby adjustment alignment of the worm and its tubular extension relative to the housing and the personally rotatable shaft is readily accomplished.

Other objects of this invention will appear in the following description and appended claims, reference being had to the accompanying drawings forming a part of this specification wherein like reference characters designate corresponding parts in the several views.

FIGURE 3 is a fragmentary transverse sectional view through the reaction mechanism taken in the direction of the arrows substantially along the line 3—3 of FIGURE 1.

FIGURE 6 is a fragmentary enlarged view taken in the direction of the arrows substantially along the line 6—6 of FIGURE 1.

FIGURE 7 is a fragmentary sectional view through the rockshaft taken in the direction of the arrows substantially along the line 7—7 of FIGURE 1.

FIGURE 8 is a fragmentary enlarged transverse sectional view taken in the direction of the arrows substantially along the line 8—8 of FIGURE 1.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
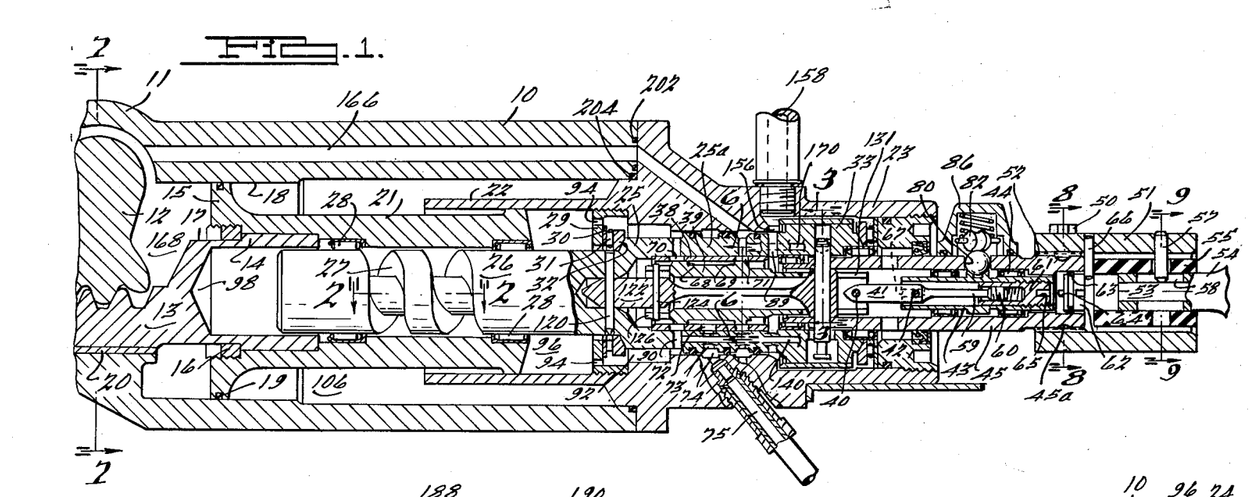
FIGURE 1 is a fragmentary longitudinal mid-sectional view through a steering mechanism embodying the present invention showing a closed center or admitting type spool valve at the neutral or straight ahead steering position.
Figure 4:
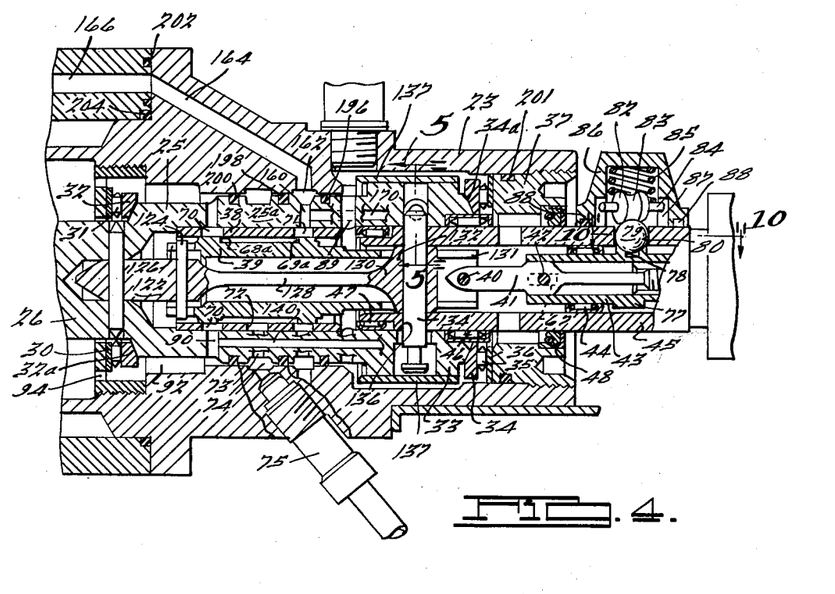
FIGURE 4 is a fragmentary enlarged sectional view similar to FIGURE 1, but showing an emitting type spool valve.

Referring to the drawings and in particular to FIGURES 1 and 4, a variable ratio power steering mechanism is illustrated wherein the structure and operation of the parts are the same except that in FIGURE 1, an admitting type spool valve is illustrated and in FIGURE 4 an emitting type spool valve is illustrated. Otherwise, except as specifically noted below, the description of either FIGURE 1 or 4 applies to the other.

The steering mechanism shown comprises a housing member 10 suitably mounted in fixed relationship on the vehicle body and having an enlarged portion 11 containing the segmental gear 12 of a rockshaft, FIGURE 7, suitably meshed with a gear rack 13. The latter is provided with an integral tubular extension 14 abutting an annular shoulder of a bore enlargement of an axially slidable piston 15 and secured coaxially thereon by a nut 16. The nut 16 fits closely around a reduced portion 17 of the extension 14 and screws into an internally threaded second enlarged bore of the piston 15 so as to abut an annular shoulder of the extension 14 at the right end of the reduced portion 17, thereby to secure piston 15 and gear rack 13 together for movement as a unit.

The piston 15 is hydraulically actuated as described below to reciprocate axially within a cylindrical bore 18 of the housing 10 and is provided with a suitable annular piston ring or seal 19 around its outer periphery adjacent the inner wall of the cylinder 18 to prevent leakage of hydraulic fluid from one side of the piston to the other. A suitable bushing 20 interposed between the housing 10 and rack 13 minimizes the latter's sliding friction.

Extending coaxially from the right end of piston 15 is an integral tubular extension 21 which contains the rack extension 14 and is slidable within a generally tubular sleeve guide 22 of a housing member 23. The latter comprises a continuation of the housing 10 and is suitably secured thereto, as for example by bolts 24, FIGURE 2.

The housing 23 is provided with a bore for a cylindrical enlarged tubular extension 25 of a rotatable worm shaft 26 having a helical worm portion 27 journalled in extension 21. Two sets of axially spaced needle bearings 28 recessed into the bore of extension 21 provide bearing support for shaft 26. Axial movement of shaft 26 with respect to housing 10, 23 is prevented by an annular nut 29 screwed into the bore of housing 23 around shaft 26 and having a radially inner portion abutting an annular race 30 for a set of thrust sustaining needle bearings 31. The opposing race 32 for the needle bearing set 31 is formed with a conically tapered face which provides an axial thrust sustaining seat for a spherically formed shoulder 32a at the juncture of the worm shaft 26 with its enlargement 25, FIGURE 4. A terminal cylindrical enlargement 33 of the worm shaft 26 is spaced from enlargement 25 by an intermediate enlargement 25a and terminates at the right in FIGURES 1 and 4 in a spherically formed shoulder 34a comparable to the shoulder 32a. Shoulder 34a seats against the conically tapered surface of an inner needle bearing race 34 for an annular set of needle bearings 35. The outer race 36 for the bearings 35 comprises a flat annular member comparable to the race 30 and is retained in position by a nut 37 screwed into the bore of housing 23. The surfaces 32a and 34a are annular sectors of a sphere centered on the axis of rotation of shaft 26, whereby limited alignment adjustment of the latter with respect to the housing 23 and other elements of the structure described below is enabled. To this end, a slight clearance is provided between the inner cylindrical surface of housing portion 23 and the juxtaposed outer cylindrical surfaces of shaft portions 25 and 25a.

Fitting closely within the bore of shaft enlargement 25 is an annular window type sleeve 38, FIGURES 4 and 6, which in turn encloses a tubular axially shiftable valve spool 39. The right end of tubular spool 39 is pivotally connected by a pin 40 to a coupling member 41 which is pivotally connected by a pin 42 to an axially shiftable tubular valve actuator 43. The latter is sleeved over the right end of member 41 in sliding supporting relation and is rotatably journalled by means of needle bearings 44 for relative rotation coaxially with respect to a tubular torque shaft 45 enclosing the bearings 44 and actuator 43. The left end of shaft 45 terminates within the bore of worm shaft enlargement 33 and is journalled therein by means of needle bearings 46 and 47 to rotate coaxially therein. A suitable seal 48 between shaft 45 and nut 37 prevents endwise loss of hydraulic fluid from the interior of the system.

Referring to FIGURES 1 and 8, an annular groove 45a is formed in the outer surface of shaft 45 to receive the tapered end of a bolt 50 which is screwed transversely into a tubular connector 51 at an eccentric location so as to key connector 51 and shaft 45 together against relative axial movement. These members extend coaxially and are splined together against relative rotational movement by interfitting axially extending serrations 52 at the inner surface of connector 51 and at the exterior surface of shaft 45.

Figure 9:
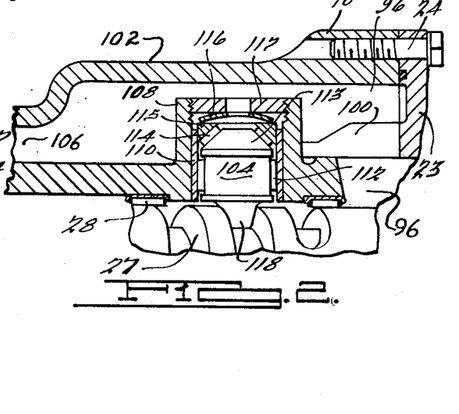
FIGURE 9 is a fragmentary enlarged transverse sectional view through the flexible coupling, taken in the direction of the arrows substantially along the line 9—9 of FIGURE 1.

Extending into a diametrical axially extending slot 56 in the right end of the tubular connector 51 is the flattened end 53 of a tubular steering shaft 54, FIGURE 9. A rubber sound and shock insulating sheath 55 closely confines the end 53 and in turn is snugly confined between the opposed sidewalls of the slot 56. A safety pin 57 extends snugly and diametrically through the connector 51 at the region of the slot 56 and into an axial slot 58 formed in flattened end 53 in order to allow axial adjustment of the steering tube 54 while at the same time preventing complete axial separation of the tube 54 from connector 51. Also by virtue of the slot 58 and the resiliency of the sheath 55, limited universal pivotal movement between connector 51 and tube 54 is enabled to accommodate for production misalignments and road vibration.

Extending from the right of coupling 41 is an integral shaft 59 which terminates in a screw portion 60 having comparatively fine screw threads engaged with mating interior threads within the bore of an externally threaded valve adjusting screw 61. The latter in turn is provided with coarser threads than the threads of portion 60 and is screwed into the interior threaded right end portion of valve actuator 43. In the present instance the portion 60 and the exterior of screw 61 are provided with right hand screw threads, the portion 60 having twenty-eight threads per inch and the exterior of screw 61 having twenty threads per inch. Accordingly upon adjustment of screw 61 as explained below, a micrometer adjustment of the axial position of shaft 59, connector 41, and valve spool 39 is readily accomplished.

The right end of the bore of shaft 45 is provided with a smooth bore enlargement containing a cylindrical adjusting plug 62 having an O-ring seal 63 around its outer periphery in sealing engagement therewith and with the aforesaid bore enlargement of shaft 45 to prevent loss of hydraulic fluid from the interior of shaft 45. A screw driver type blade 64 is formed on the inner surface of plug 62 for engagement with the kerf 65 in the right end of screw 61. Normally fluid pressure within shaft 45 urges plug 62 to the right, the plug being retained in position by pin 66 secured within connector 51. The axial adjusting movement of coupling 41 and pin 42 with respect to actuator 43 is enabled by a pair of diametrically opposed axially extending slots 67 in the left end of actuator 43, whereby pin 42 is confined against angular displacement with respect to actuator 43 but is movable axially thereof to the extent of slot 67 without causing disengagement of coupling 41 from actuator 43.

The structures of FIGURES 1 and 4 described thus far are the same, the difference being that in FIGURE 1, a pair of annular lands 68 and 69 spaced axially on spool 39 are arranged to maintain piston working ports 70 and 71 respectively in sleeve 38 closed to the high pressure hydraulic fluid during normal straight-ahead steering. In FIGURE 4 on the other hand, the annular lands 68a and 69a, comparable in all other respect to the lands 68 and 69, are arranged to admit the high pressure fluid to both ports 70 and 71, as explained below. Referring again to both FIGURES 1 and 4, an inlet port 72 is formed in sleeve 38 between lands 68 and 69 of FIGURE 1, and between lands 68a and 69a of FIGURE 4, to provide communication with the annular space between the lands and a plurality of inlet ducts 73 extending radially through shaft enlargement 25a and opening into an annular recess 74 in the outer periphery of enlargement 25a. The recess 74 communicates with an inlet fitting 75 connected with the high pressure hydraulic fluid source.

The ports 70 and 71 are formed similarly as illustrated in FIGURE 6 and extend throughout the major circumferential extent of sleeve 38. Referring to FIGURE 6, port 71 comprises three windows equally spaced circumferentially by small portions of the body of sleeve 38. Prior to assembly of the sleeve 38 within the bore of extensions 25 and 25a, each window of port 71 is first punched or pierced approximately to size in a tubular sleeve blank. The sides of the windows are then ground to the proper axial dimension to complete the tubular sleeve 38 by means of a cam grinding wheel 38a illustrated in phantom, FIGURE 6. Thus opposite ends of each window of port 71 is arcuate on a radius equal to the radius of the wheel 38a. The total circumferential extent of the portions of the body of sleeve 38 spacing the three windows of port 71 is less than the circumferential extent of any one of the three windows. In accordance with the foregoing, port 71 is readily finished by grinding sleeve 38 from its exterior, and internally ground grooves within the housing for spool valve 39 are avoided. The completed sleeve 38 is then pressed into the bore of extensions 25 and 25a and the interior bore of sleeve 38 is finished to complete the valve housing assembly. A superior and more accurate valve assembly is thus achieved. The same considerations apply to port 70.

Figure 10:
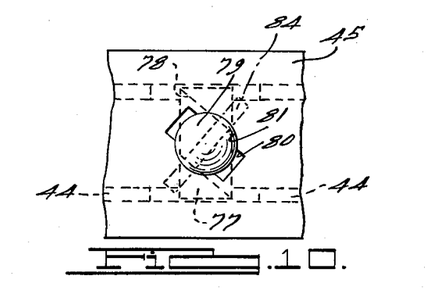
FIGURE 10 is a fragmentary enlarged view showing details of the valve actuating mechanism, taken in the direction of the arrows substantially along the line 10—10 of FIGURE 4.
Figure 11:
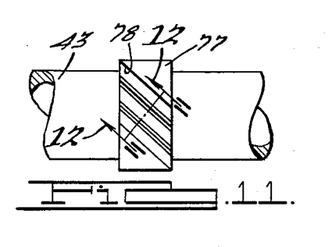
FIGURE 11 is a fragmentary enlarged view similar to FIGURE 10, but with the torque shaft removed.
Figure 12:
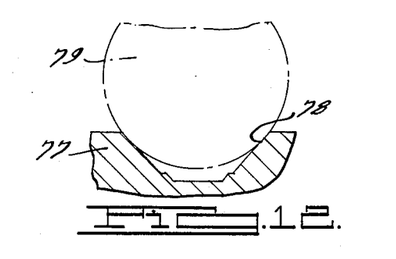
FIGURE 12 is a fragmentary sectional view taken in the direction of the arrows substantially along the line 12—12 of FIGURE 11.

In order to actuate the valve spool 39 to effect a power steering assist as described below, the actuator 43 is provided with an integral annular enlargement 77 which in turn is provided with a helical segment of a cam groove or ball guide 78 having radially inwardly converging side walls supporting a spherical cam follower or ball 79, FIGURES 10, 11, and 12. The latter is confined within a slot 80 formed in torque tube 45 obliquely to the latter's axis and extending endwise in parallelism with the underlying guide 78. The mid portions of slot 80 at opposite sides of guide 78 are formed spherically at 81 to confine the ball 79 in bearing relation, FIGURE 10. By virtue of the oversize endwise dimension of slot 80, frictional contact between the balls 79 and torque tube 45 is minimized.

The ball 79 is urged radially inward into seating engagement with the helical cam groove 78 by a grooved roller 82 having a groove 83 of spherical section in its outer surface mating with the spherical surface of the ball 79. An axial shaft 84 extends through roller 82 perpendicularly to the helical angle of cam 78 and urges the ball 79 radially into seated engagement with track 78 by means of a coil spring 85 under compression between the shaft 84 and a housing member 86 suitably secured by bolts not shown to torque shaft 45 to rotate therewith. Radial slots 87 are provided within the interior of housing member 86 to allow freedom of radial movement of the ends of shaft 84. Otherwise roller 82 is confined against movement axially and circumferentially of shaft 45. A suitable seal 88 recessed into housing 86 at its juncture with shaft 45 extends around the slot or opening 80 to prevent loss of fluid therethrough beyond the limits of housing 86.

It is apparent that upon leftward steering movement of tube 54, that is, counterclockwise looking at the right ends of FIGURES 1 and 4, connector 51 and torque shaft 45 will be turned so as to move ball 79 with respect to the helical cam 78 and thereby move the latter and actuator 43 leftward in FIGURES 1 and 4. Accordingly, link 41 connecting with actuator 43 by the screw means 60, 61 moves spool valve 39 to the left causing leftward movement of land 68 in FIGURE 1 and opening left turn working port 70 to the inlet pressure via inlet ports 72 and 74. During this action, leftward movement of land 69 maintains right turn working port 71 closed to the inlet pressure, but increases the opening to port 71 which communicates with a plurality of exhaust ducts 89 formed radially in worm shaft enlargement 25a.

The same leftward steering movement in FIGURE 4 causes leftward movement of land 68a, thereby increasing the extent of communication between working port 70 and the inlet pressure and simultaneously decreasing the communication between the inlet pressure and working port 71. In the same action, as port 71 is closed to the inlet pressure, continued leftward movement of land 69a opens port 71 to the exhaust ducts 89. The fluid inlet pressure applied to left turn working port 70 in FIGURE 1, or the relative increase in the pressure differential between left turn working port 70 and right turn working port 71 in FIGURE 4, is conducted through a plurality of left turn ports 90 formed radially in worm shaft enlargement 25 and thence into an annular recess 92 formed in housing 23.

Recess 92 is connected by axial ducts 94 in nut 29 with annular chamber 96 formed by housing 23 at the right end of piston extension 21. Fluid leakage from chamber 96 around shaft 26 and past bearings 28 conducts the fluid inlet pressure to the interior of gear rack 13 at 98. The fluid pressure from chamber 96 is also conducted via slot 100 in housing extension 22, FIGURE 2, to the interior of dome 102 comprising an integral enlargement of housing 10 for a worm follower 104. The inlet fluid pressure is conducted from the interior of dome 102 to the annular chamber 106 at the right of piston 15 between the latter's extension 21 and housing 10. Accordingly during a left turn, the entire surface area at the right side of the structure of piston 15 is exposed to the high pressure inlet fluid to urge piston 15 to the left.

Figure 2:
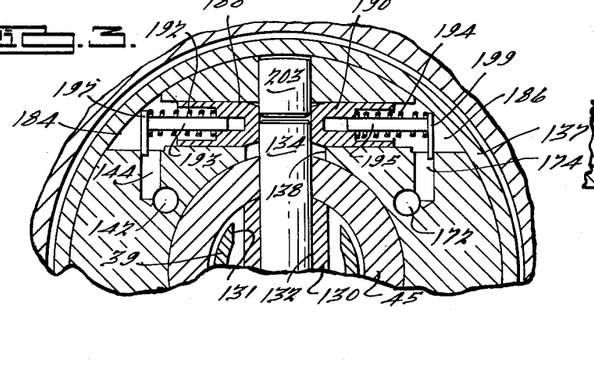
FIGURE 2 is a fragmentary longitudinal sectional view taken in the direction of the arrows substantially along the line 2—2 of FIGURE 1.

At the region of the worm 27, FIGURE 2, the piston extension 21 is formed with an integral radial cylindrical dome 108 enclosing a cylindrical bushing 110 perpendicular to the axis of shaft 26. The dome 108 rides freely axially in slot 100 upon axial reciprocation of piston 15. An annular set of needle bearings 112 space the follower 104 from the bushing 110. The outer portion of follower 104 is formed conically at 113 and is seated against a conical set of needle bearings 114 which in turn are seated against the conical inner surface of a retaining race 115. The outer surface of the latter is flat and is urged radially inward by the tension of a Belleville type washer 116 compressed between the outer surface of the race 115 and the inner surface of a retaining nut 117 screwed into the radially outer end of dome 108. The radially inner end of follower 104 comprises a conically tapered extension 118 within the grooves of worm 27 so as to follow the same and rotate shaft 26 upon axial movement of piston 15.

As indicated in FIGURE 2, upon leftward movement of piston 15 as described above, worm 26 is rotated in a left turn to assist the manual steering effort applied at steering tube 54. By virtue of the structure shown, the lead angle of worm 27 can be feasibly varied along the axial length of the worm. At the central portion of the worm 27 which contains the conical follower portion 118 during normal straight-ahead steering, the lead angle of the worm 27 is approximately the same as in conventional power steering mechanisms. As the worm 27 turns in either direction from the central position illustrated in FIGURE 2, the helical angle of the worm increases to effect a greater axial movement of the rack 13 for any given angular movement of worm 27.

Figure 5:
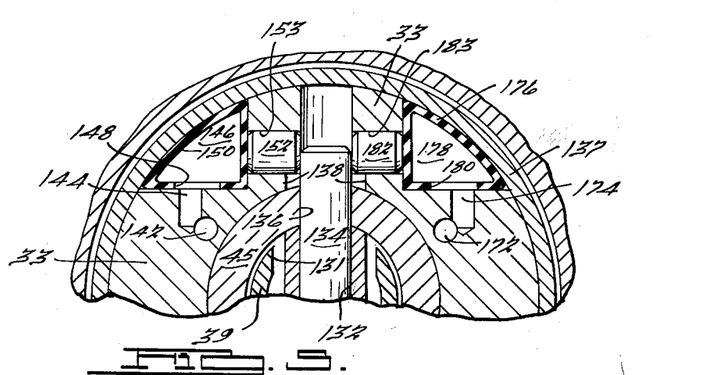
FIGURE 5 is a view similar to FIGURE 3 showing a modified fluid pressure reaction mechanism.

A pin 120 extending diametrically through shaft 26 and an enlargement 122 of a torsion rod arranged coaxially within shaft 26 and the bore of its extension 25 keys these elements together for rotation as a unit. A second pin 124 extending diametrically through the enlargement 122 and through diametrically opposed slots 126 in the left end of valve spool 39 keys these members together for rotation as a unit but enables the above-described relative axial adjustment of valve spool 39 by reason of the axial extent of slots 126. Extending to the right of the enlargement 122 is a reduced integral torsion rod 128 which terminates at its right end in an enlargement 130 which is relatively pivotal with respect to the end 122 upon twisting of rod 128. As indicated in FIGURE 5, the enlargement 130 is flattened so as to extend axiallly of spool valve 39 and radially in opposite directions within diametrically opposed lost motion slots 131 in the right end of the latter. A diametrically extending hole 132 in the right end of enlargement 130 closely confines a diametrical pin 134 for rotation with enlargement 130, FIGURES 4 and 5. Torsion rod 128 is thus confined at its opposite ends and serves as a thrust member tying shafts 45 and 26 together. Opposite ends of pin 134 extend diametrically through closely confining openings 136 in shaft 45 so as to key the latter for rotation with portion 130. A cylindrical sleeve 137 around enlargement 33 closely confines the latter and defines in part the fluid reaction chambers described below.

Pin 134 also extends radially at opposite ends into lost motion slot 138, FIGURE 5, formed in worm shaft enlargement 33 to enable limited rotational movement of the latter shaft with respect to shaft 45. Also slot 131 enables the same rotational lost motion of shaft 45 with respect to spool valve 39. Upon manual turning of steering tube 54 and torque shaft 45, pin 134 is rotated about the axis of torsion rod 128 tending to cause relative rotation of its right end 130 with respect to its left end 122. The road reaction resisting turning movement of the vehicle wheels and of the steering gear operably connected with rockshaft 12 is transmitted through rack 13, piston 15, and worm shaft 26 to the relatively fixed end 122 of the torsion rod. Accordingly this road reaction force is felt by the driver of the vehicle during his manual effort tending to rotate torsion extension 130 relative to the extension 122 against the resilient action of torsion rod 128.

Also during the left turn steering movement described above, the inlet fluid pressure applied through port 70 in FIGURE 1, or the increased inlet pressure applied at 70 with respect to the inlet pressure applied at port 71 as in FIGURE 4, is directed through left turn reaction duct 140 to port 142 in the worm shaft enlargement 25a and 33 respectively, FIGURES 3 and 5. Referring again to FIGURE 5, port 142 communicates with duct 144 which in turn opens into a reaction pressure chamber 146 in enlargement 33 via an opening 148 in a hollow flexible resilient rubber-like bagging type seal 150 lining the chamber 146. A hydraulically actuated cylindrical plunger 152 shiftable transversely to pin 134 and torsion rod 128 is contained within a cylindrical bore 153 in enlargement 33 and is engaged at opposite ends by one face of seal 150 and the radial extremity of shaft 134 to resist counterclockwise pivoting of the latter with a force proportional to the hydraulic pressure driving the piston 15. Accordingly the resilient reaction of torsion rod 128 is augmented by the hydraulic reaction which is proportional to the actual steering force required to turn the vehicle dirigible wheels.

Upon continued leftward shifting of spool valve 39 to increase the openings of the left turn working ports 70 to the inlet pressure in either FIGURE 1 or FIGURE 4, the working port 71 progressively opens to permit discharge of fluid from the left side of piston 15 to the right of land 69 or 69a as the case might be to discharge port 89 and thence to drain duct 156 in housing portion 23 which communicates with a drain fitting 158. The latter is secured to the housing 23 and returns to a suitable sump or to the inlet side of a high pressure steering pump. Port 71 connects with a plurality of ducts 160 formed radially in worm shaft enlargement 25a and which in turn communicates with an annular recess 162 in the outer periphery of enlargement 25a. The recess 162 communicates via conduit 164 in housing portion 23 and conduit 166 in housing portion 10 with chamber 168 of housing enlargement 11 at the left side of piston 15, FIGURE 1.

When a right turn manual steering effort is applied to steering tube 54, the reverse of a left turn operation takes place. Ball 79 in cam groove 78 operates to cause rightward axial movement of valve operator 43, together with link 41 and valve spool 39, thereby to open right turn working port 71 to the inlet pressure as in FIGURE 1, or to increase the opening of right turn working port 71 with respect to left turn working port 70 to the inlet pressure as in FIGURE 4. In such an event, the fluid at the right side of piston 15 returns to the exhaust duct 89 via ducts 90, ports 70, thence around the left end of spool valve 39, through the hollow interior of the latter to its right end, through slot 131 and the clearance between the inner surface of torque shaft 45 and the reduced outer diameter at the right end of valve 39.

The high pressure hydraulic fluid entering port 71 upon rightward shifting of valve 39 also enters right turn reaction duct 170 in worm extension 25a, 33 and communicates with port 172 connected with duct 174 in worm extension 33. The latter duct opens into right turn reaction chamber 178 via port 180 in the bagging type seal 176 which lines the chamber 178. Cylindrical plunger 182 comparable to plunger 152 and also shiftable perpendicularly to the axis of pin 134 in cylinder bore 183 engages pin 134 and seal 176 at its opposite ends to resist clockwise pivoting of shaft 134 with a force proportional to the hydraulic pressure actuating piston 15.

It is to be noted that the bagging type reaction seals 150 and 176 of FIGURE 5 can be employed with either the closed center type valve spool of FIGURE 1 or the emitting type valve spool FIGURE 4. When the structure of FIGURE 5 is employed with the emitting type valve of FIGURE 4, both reaction chambers 146 and 178 will be subject to the fluid inlet pressure during a normal steering movement, so that the reaction or road feel will be proportional to the pressure differential in the chambers 146 and 178, which in turn is proportional to the difference in the extent of opening between working ports 70 and 71 to the inlet pressure. As employed with the structure of FIGURE 4, both reaction chambers 146 and 178 are subject to the full hydraulic pressure which is applied simultaneously to both sides of piston 15 when the latter is at the neutral or straight-ahead steering position shown. In this situation, the resultant force on pin 134 is zero. As the steering effort shifts the valve 39 to progressively increase the hydraulic pressure on one side of piston 15 and to decrease the pressure on the other side thereof, as explained above, the difference in the pressures at the right and left sides of piston 15 tending to power the steering motion is applied to chambers 146 and 178 respectively to effect a resultant reaction force. Inasmuch as the reaction force in FIGURE 4 depends on the resultant balance between the pressures in the chambers 146 and 178, a stop limiting movement of plungers 152 and 182 toward each other at their neutral or straight-ahead steering position is not preferred.

On the other hand, when the reaction structure of FIGURE 5 is employed with the closed center type of valve of FIGURE 1, each plunger 152 and 182, which is subject to the hydraulic reaction pressure in the left turn and right turn respectively, is opposed only by the normal low back pressure of the hydraulic fluid in the return duct 89 acting on the other plunger. Thus during a left turn for example, the hydraulic reaction pressure of chamber 146 urging plunger 152 against pin 134 is opposed by the hydraulic discharge back pressure in reaction chamber 178 urging plunger 182 against pin 134. During a right turn, the hydraulic reaction force urging plunger 182 against pin 134 is opposed by the hydraulic discharge back pressure urging plunger 152 against pin 134. This back pressure is adequate to urge pins 152 and 182 to their neutral straight-ahead steering position shown, and thereby to assist torsion rod 128 in returning pin 134 to the neutral position. For this reason, use of a movement limiting stop for plungers 152 and 182 at their neutral positions is preferred. Such a stop is illustrated in FIGURE 3.

The modified form of the reaction mechanism particularly suitable for use with the closed center type valve of FIGURE 1 is illustrated in FIGURE 3. The reaction pressure in duct 144 or 174 as the case may be is connected with cylinder 184 or 186 formed in shaft enlargement 33. Plungers 188 and 190 are shiftable within the cylinders 184 and 186 respectively perpendicularly to pin 134 so as to resist the latter's turning movement in the direction toward the associated plunger. Springs 192 and 194 around guides 193 and 195 respectively and under compression between the plungers 192 and 194 and outer spring seats 197 and 199 respectively of the guides 193 and 195 urge the plungers 188 and 190 against opposite sides of pin 134 to assist in centering the latter at the straight-ahead steering position. The springs 192 and 194 assist the torsion rod 128 which has its minimum influence at the straight-ahead steering position and are preferred for use with the closed center valves of FIGURE 1 because, at the straight-ahead steering position, opposite sides of piston 15 are subject only to the normally low hydraulic return pressure of exhaust duct 89. A stop pin 203 confined in enlargement 33 extends between plungers 188 and 190 to prevent either of the latter from moving toward pin 134 beyond the centered or straight-ahead neutral position shown.

In order to prevent fluid leakage from entering annular port 162 along clearance around the outer surface of the worm enlargement 25a, annular seals 196 and 198 are recessed into the outer periphery of the enlargement 25a in sealing engagement therewith and with the inner cylindrical surface of housing 23 at opposite sides of port 196. Similarly, an annular seal 200 recessed into enlargement 25a around the periphery of the latter and in sealing engagement therewith and with housing 23 is located immediately to the left of inlet port 74. Recessed into the outer circumference of nut 37 is a suitable O-ring type seal 201 which provides fluid sealing engagement between the nut and inner circumference of housing 23. An O-ring type seal 202 around the right turn conduit 166 at its juncture with the conduit 164 provides a seal between the juxtaposed portions of housing portions 10 and 23. Similarly a gasket 204 is provided between the juncture of housing portions 10 and 23 to prevent fluid leakage from the interior thereof.

Referring to FIGURE 7, the gear rack 13 is illustrated with tapered gear teeth 206 meshed with correspondingly tapered teeth 208 of sector gear 12, such that upon leftward shifting of gear 12 in FIGURE 7, the play between teeth 208 and 206 is decreased. Sector gear 12 is either formed integrally with or is splined on the right end of rockshaft 210 having an outer splined portion 212 adapted for connection with the steering linkage which turns the dirigible wheels of the vehicle upon rocking of shaft 210. The shaft 210 is journalled in two separate needle bearings 214 and 216, the former being arranged around a portion of shaft 210 between the latter and the interior of a tubular extension 218 of housing portion 11. Needle bearings 216 are arranged around shaft 210 adjacent the left end of extension 218 and are enclosed within an adjusting nut 220 screwed into the open left end of extension 218 snugly against a steel wear plate 222. The latter is retained against rightward axial movement on shaft 210 by a radially enlarged shoulder 223 thereof. Loss of fluid from extension 218 around the outer periphery of nut 220 is prevented by an annular sealing ring 224 in fluid sealing engagement with nut 220 and extension 218. Similarly, an annular sealing ring 225 around shaft 210 between needle bearing 216 and a shoulder of nut 220 provide an annular fluid seal between the latter and shaft 210.

At the right end of shaft 210 in FIGURE 7, a tensioning spring 226 seated within a bore 228 formed in the segmental gear 12 urges the latter leftward so as to maintain a predetermined positioning of the teeth 208 with respect to the teeth 206 as described below. The right end of spring 226 is seated under compression against a cupped retainer 230 which in turn is abutted by an end closure plate 232 retained in position by nut 234 screwed into the right end of housing portion 11. A suitable annular seal 236 recessed into housing 11 seats against the latter and the closure plate 232 to prevent leakage of fluid from the right end of chamber 168.

In accordance with the foregoing structure, adjusting nut 220 is screwed into the left end of housing extension 218 against washer 222 so as to force the latter and shaft 210 to the right against the tension of spring 226 until a predetermined desired minimum play or freedom of relative movement between teeth 206 and 208 is observed. Thereafter nut 220 is unscrewed a predetermined fraction of a turn to enable the tension of spring 226 to take up the play between teeth 206 and 208. By suitably determining the alloy composition of washer 222, the latter will wear at a sufficient rate so as to compensate for the wear between the teeth 206 and 208. Accordingly subsequent adjustments of nut 220 are minimized.

Summarizing the operation of the steering mechanism, when steering tube 54 is turned in a steering movement, the rotational movement is transmitted through connector 51 and torque rod 45 to reaction pin 134 and the right end 130 of torsion rod 128. During the initial stage of the steering movement, the road resistance to turning of the wheels prevents rotation of rockshaft 210 and sector gear 12, whereby piston 15 is not shifted and worm shaft 26 does not turn. In consequence, the left end 122 of torsion rod 128 remains fixed. In the event of hydraulic power failure, pin 134 and the right end 130 of torsion rod 128 will continue to rotate relative to the left end 122 to the limit permitted by slot 138 and clearance 132, FIGURES 3 and 5. This lost motion is preferably in the neighborhood of 6°. Thereafter pin 134 engages housing 33 to rotate worm 27 manually. The manual force is applied through follower 118 to sleeve 21 and thence to piston 15, rack 13, gear 12 and rockshaft 210 to effect manual steering.

In the event that the hydraulic system is normally operating, the rotation of torque shaft 45 with respect to worm shaft 26 and its extension 25, which is keyed by torsion rod end 122 and pin 124 to spool valve 39, causes ball 79 to ride along the helical track 78 in valve actuator 43, thereby to move the latter in accordance with leftward or rightward turning of torque shaft 45. Movement of actuator 43 is transmitted through link 41 to valve 39, thereby to shift the latter and effect a differential fluid pressure across piston 15 to move the latter as described above. Follower 104 rotatably journalled in sleeve 21, which reciprocates with piston 15, rides in the groove of worm 27 to rotate the latter and assist the manual steering effort until the relative angular displacement between end 130 and 122 of torsion rod 128 is eliminated. At this condition torsion rod 128 is under no stress and the hydraulic forces on opposite sides of piston 15 are in balance.

By virtue of the ball 79 supported from above by the floating spring urged roller 82 and riding in the helical track 78, a highly efficient valve actuation is accomplished which moves spool valve 39 approximately five times as fast for any given angular displacement of shaft 45 than does conventional structures. In consequence, adequate travel of the spool valve 39 with respect to sleeve 38 is accomplished with a slight steering movement and an appreciable overlap between the lands 68 and 69, of FIGURE 1, or 68a and 69a of FIGURE 4, with respect to the sleeve ports 70 and 71 is rendered feasible to avoid undesired leakage around the valve lands. The structure shown is particularly useful with the closed center type of valve illustrated in FIGURE 1 wherein appreciable overlap between lands 68 and 69 and the juxtaposed portions of sleeve 38 when the spool valve is at the neutral position is required in order to prevent leakage of high pressure fluid to the piston working ports 70 and 71.

Also when the hydraulic system is operating properly, during relative angular displacement of torque rod 45 with respect to worm shaft 26, the manual steering effort is opposed both by the spring torsion of rod 128 as well as by the difference in fluid pressures in chambers 146 and 178, which is proportional to the hydraulic pressure required to effect the steering movement, or by the hydraulic pressure in either chamber 184 or 186 as the case might be, which pressure is also proportional to the pressure applied to effect the steering movement.

I claim:

1. In a power steering gear for an automotive vehicle, a housing, an axially shiftable tubular shaft means having portions operably connectible with the dirigible wheels of said vehicle to steer the same upon axial shifting of said shaft means, said shaft means having a piston portion for shifting the same, a worm shaft rotatably journalled coaxially within said tubular shaft, a worm follower carried by said tubular shaft and engaging said worm to turn the same upon axial shifting of said piston, said worm also having a tubular extension journalled in said housing, a torsion rod extending coaxially within said extension and having one end secured to said worm to rotate therewith, a personally rotatable shaft coaxial with said worm and secured to the other end of said torsion rod to rotate therewith, a lost motion connection between the latter shaft and said worm enabling limited relative rotational displacement therebetween, an axially shiftable tubular valve spool having said torsion rod extending coaxially thereinto, means connecting said spool with said worm for rotation therewith, cam means carried by said latter shaft and spool for shifting said spool axially upon rotation of said latter shaft, and means including portions carried by said spool for selectively directing fluid pressure to either side of said piston upon axial shifting of said spool.

2. In a power steering gear for an automotive vehicle, a housing, an axially shiftable tubular shaft means having portions operably connectible with the dirigible wheels of said vehicle to steer the same upon axial shifting of said shaft means, said shaft means having a piston portion for shifting the same, a worm shaft rotatably journalled coaxially within said tubular shaft, a worm follower carried by said tubular shaft and engaging said worm to turn the same upon axial shifting of said piston, said worm also having a tubular extension journalled in said housing, a torsion rod extending coaxially within said extension and having one end secured to said worm to rotate therewith, a personally rotatable shaft coaxial with said worm and secured to the other end of said torsion rod to rotate therewith, a lost motion connection between the latter shaft and said worm enabling limited relative rotational displacement therebetween, an axially shiftable tubular valve spool having said torsion rod extending coaxially thereinto, means connecting said spool with said one end of said torsion rod for rotation therewith, said spool having a projection extending endwise beyond the other end of said torsion rod, an axially shiftable cam shaft means secured coaxially to said spool extension, a helical ball guide track carried by said cam shaft means, a ball movable along said track and rotatably carried by said personally rotatable shaft to effect axial movement of said cam shaft means upon rotation of said personally rotatable shaft, and means including portions carried by said spool for selectively directing fluid pressure to either side of said piston upon axial shifting of said spool.

3. In a power steering gear for an automotive vehicle, a housing, a sector gear pivotally mounted in said housing for rocking motion and having means operably connectible with the dirigible wheels of said vehicle to steer the same upon rocking of said gear, a gear rack shiftable transversely of the pivot axis of said sector gear and meshed therewith to effect said rocking, said rack terminating at one end in a tubular extension having an axis parallel to the directions of shifting of said rack, a piston having a tubular extension, means interconnecting said extensions coaxially to comprise a tubular shaft, a worm shaft rotatable coaxially within said tubular shaft, a worm follower carried by said tubular shaft and engaging said worm to turn the same upon axial shifting of said piston, a personally rotatable steering member, lost motion means operatively connecting said worm and steering member to turn the former upon rotation of the latter at the limits of lost motion effected by the connection between said worm and steering member, torsion means interconnecting said worm and steering member to resist relative rotational movement therebetween, means including shiftable valve means for selectively directing pressurized fluid to either side of said piston, and means operably connecting said steering member and valve means for actuating the same upon said lost motion of said steering member with respect to said worm.

4. In a power steering gear for an automotive vehicle, a housing, an axially shiftable tubular shaft means having portions operably connectible with the dirigible wheels of said vehicle to steer the same upon axial shifting of said shaft means, said shaft means having a piston portion for shifting the same, a worm shaft rotatably journalled coaxially within said tubular shaft, a worm follower carried by said tubular shaft and engaging said worm to turn the same upon axial shifting of said piston, said worm also having a tubular extension journalled in said housing, a torsion rod extending coaxially within said extension and having one end secured to said worm to rotate therewith, a personally rotatable shaft coaxial with said worm and secured to the other end of said torsion rod to rotate therewith, a lost motion connection between the latter shaft and said worm enabling limited relative rotational displacement therebetween, an axially shiftable tubular valve spool having said torsion rod extending coaxially thereinto, means connecting one end of said torsion rod to said spool for rotation therewith, said spool having a projection extending endwise beyond the other end of said torsion rod, an axially shiftable cam shaft means secured coaxially to said spool extension, said cam shaft means extending coaxially into said personally rotatable shaft and being journalled therein, a helical ball guide track carried by said cam shaft means, a ball movable along said track and rotatably carried by said personally rotatable shaft to effect axial movement of said cam shaft means upon rotation of said personally rotatable shaft.

5. In a power steering gear, a housing, a rotatable member having a tubular extension journalled in said housing and also having means operably connectible with a steering linkage, a torsion rod extending coaxially within said extension and having one end secured to said member to rotate therewith, a personally rotatable shaft coaxial with said member and secured to the other end of said torsion rod to rotate therewith, a lost motion connection between the latter shaft and said member enabling limited relative rotational displacement therebetween, an axially shiftable tubular valve spool having said torsion rod extending coaxially thereinto, means connecting said spool with said one end of said torsion rod for rotation therewith, said spool having a projection extending endwise beyond the other end of said torsion rod, an axially shiftable cam shaft means secured coaxially to said spool extension, a helical ball guide track carried by said cam shaft means, a ball movable along said track and rotatably carried by said personally rotatable shaft to effect axial movement of said cam shaft means upon rotation of said personally rotatable shaft, and fluid actuated means including portions carried by said spool for rotating said member upon axial shifting of said spool.

6. In a power steering gear, a housing, a rotatable member having a tubular extension journalled in said housing and also having means operably connectible with a steering linkage, a torsion rod extending coaxially within said extension and having one end rotatable with said member, a personally rotatable shaft coaxial with said member and secured to the other end of said torsion rod to rotate therewith, a lost motion connection between the later shaft and said member enabling limited relative rotational displacement therebetween, an axially shiftable tubular valve spool having said torsion rod extending coaxially thereinto, means cooperable with said spool and said one end for connecting said spool and one end with said member for rotation therewith, an axially shiftable cam shaft means secured coaxially to said spool, said cam shaft means extending coaxially into said personally rotatable shaft and being journalled therein, and fluid actuated means including portions carried by said spool for rotating said member upon axial shifting of said spool.

7. In a power steering gear, a personally rotatable first shaft, a cam shaft journalled coaxially within said first shaft, cam means on said two shafts interengageable to shift said cam shaft axially upon relative rotation therebetween, a rod, means including screw threaded means securing said rod to said cam shaft in axially adjusted position, and a spool valve secured to said rod in axially adjusted postion.

8. In a power steering gear, a personally rotatable first shaft, cam shaft means, means on said first shaft rotatably supporting said cam shaft means for rotation coaxially with said first shaft, cam means on said first shaft and said cam shaft means interengageable to shift said cam shaft means axially with respect to said first shaft upon relative rotation therebetween, said cam shaft means including a projection and screw threaded means for adjusting the relative axial position of said projection, and a spool valve secured to said projection in axially adjusted position.

9. In a power steering gear, a housing, a personally rotatable first shaft, cam shaft means, means on said first shaft rotatably supporting said cam shaft means for rotation coaxially with said first shaft, cam means on said first shaft and said cam shaft means interengageable to shift said cam shaft means axially with respect to said first shaft upon relative rotation therebetween, said cam means including a helical ball guide track on a portion of said cam shaft means extending coaxially within said first shaft, a ball carried in an opening in the sidewall of said first shaft, said ball being rotatable in said opening and having its inner portion riding in said guide track, a grooved roller carried by said housing and having the outer portion of said ball riding in the groove of said roller to support said ball against outward displacement, said cam shaft means including a projection and screw threaded means for adjusting the relative axial position of said projection, and a spool valve secured to said projection in axially adjusted position.

10. In a power steering gear, a housing, a personally rotatable first shaft, cam shaft means, means on said first shaft rotatably supporting said cam shaft means for rotation coaxially with said first shaft, cam means on said first shaft and said cam shaft means interengageable to shift said cam shaft means axially with respect to said first shaft upon relative rotation therebetween, said cam means including a helical ball guide track on a portion of said cam shaft means extending coaxially within said first shaft, a ball carried in an opening in the sidewall of said first shaft, said ball being rotatable in said opening and having its inner portion riding in said guide track, a grooved roller carried by said housing and having the outer portion of said ball riding in the groove of said roller to support said ball against outward displacement, resilient means urging said roller radially inward toward said ball, said cam shaft means including a projection and screw threaded means for adjusting the relative axial position of said projection, and a spool valve secured to said projection in axially adjusted position.

11. In a power steering gear, a personally rotatable first shaft, cam shaft means, means on said first shaft rotatably supporting said cam shaft means for rotation coaxially with said first shaft, cam means on said first shaft and said cam shaft means interengageable to shift said cam shaft means axially with respect to said first shaft upon relative rotation therebetween, said cam shaft means including a projection and screw threaded means for adjusting the relative axial position of said projection, said screw threaded means including a first screw threaded portion in screw engagement with a second screw threaded portion of said cam shaft means and also including a third screw threaded portion of said projection in screw engagement with said second portion, the number of threads per unit length engaging said first and second screw threaded portions being less than the number of threads per unit length engaging said second and third screw threaded portions, both sets of threads having the same direction of lead, and a spool valve secured to said projection in axially adjusted position.

12. In a power steering gear, a personally rotatable first shaft, a power rotatable second shaft, a shiftable valve spool, fluid actuated means including portions carried by said spool for rotating said second shaft upon axial shifting of said spool, a valve actuator, means interconnecting said first shaft and valve actuator to shift the same upon rotation of said first shaft with respect to said second shaft, and adjustment means connecting said actuator and spool for effecting fine adjustment of the latter with respect to said actuator.

13. In a power steering gear, a personally rotatable tubular first shaft, a power rotatable second shaft, a shiftable valve spool, fluid actuated means including portions carried by said spool for rotating said second shaft upon axial shifting of said spool, a tubular valve actuator journalled within said first shaft, comprising a first screw in threaded engagement with said tubular actuator and having a portion accessible from one end of said tubular first shaft, said adjustment means also comprising a second screw in threaded engagement with said first screw and connected with said valve to shift the same upon turning of said first screw with respect to said actuator and second screw, and a fluid sealing plug closing said one end of said first shaft, said plug being shiftable axially and rotatable within said one end and having a portion engageable with said portion of said first screw to turn the same when said plug is shifted axially toward said first screw and rotated, and means to limit axial endwise shifting of said plug from said one end.

14. In a power steering gear, a personally rotatable tubular first shaft, a power rotatable second shaft, a shiftable valve spool, fluid actuated means including portions carried by said spool for rotating said second shaft upon axial shifting of said spool, a tubular valve actuator within said first shaft, means interconnecting said first shaft and valve actuator to shift the same upon rotation of said first shaft with respect to said second shaft, adjustment means connecting said actuator and valve spool to adjust the axial position of the latter with respect to said actuator, said adjustment means having a portion accessible from one end of said tubular first shaft, and a fluid sealing plug closing said one end of said first shaft, said plug being shiftable axially and rotatable within said one end and having a portion engageable with said adjustment means to actuate the same when said plug is shifted axially toward said first screw and rotated, and means to limit axial endwise shifting of said plug from said one end.

15. In a power steering gear, a personally rotatable first shaft, a coaxial second rotatable shaft having a tubular extension, a torsion rod and an axially shiftable valve spool arranged coaxially within said extension, means keying said spool and one end of said torsion rod to said second shaft for rotation therewith, the other end of said torsion rod extending coaxially into a tubular portion of said first shaft, a pin extending diametrically through said tubular portion and other end to key the same for rotation together as a unit, said pin extending radially into a lost motion slot in said tubular extension and being engageable with the latter to rotate the same upon predetermined rotation of said first shaft to the limit of said lost motion slot, means for shifting said spool axially upon relative rotation between said first and second shafts, and fluid actuated means including portions carried by said spool for rotating said second shaft upon axial shifting of said spool.

16. The combination according to claim 15 comprising a pair of cylinders in said tubular extension arranged normally to said pin, a pair of plungers in said cylinders respectively engageable with said pin upon rotation of the latter in said lost motion slot, and means for conducting fluid pressure to said cylinders to urge said plungers toward said pin to oppose said rotation of the latter.

17. The combination according to claim 15 comprising a pair of cylinders in said tubular extension arranged normally to said pin, a pair of plungers in said cylinders respectively engageable with said pin upon rotation of the latter in said lost motion slot, means for conducting fluid pressure to said cylinders to urge said plungers toward said pin to oppose said rotation of the latter, said pin engaging radially inner portions of said plungers, and a stop pin confined within said tubular extension at a location intermediate said plungers and engaging radially outer portions of the latter to limit movement thereof toward the first named pin.

18. In a power steering gear, a personally rotatable first shaft, a coaxial second rotatable shaft having a tubular extension, a torsion rod and an axially shiftable valve spool arranged coaxially within said extension, means keying said spool and one end of said torsion rod to said second shaft for rotation therewith, the other end of said torsion rod extending coaxially into a tubular portion of said first shaft, a pin extending diametrically through said tubular portion and other end to key the same for rotation together as a unit, means for shifting said spool axially upon relative rotation between said first and second shafts, fluid actuated means including portions carried by said spool for rotating said second shaft upon axial shifting of said spool, a pair of cylinders in said tubular extension arranged normally to said pin, a pair of plungers in said cylinders respectively engageable with said pin upon rotation of the latter with said first shaft, and means for conducting fluid pressure to said cylinders to urge said plungers toward said pin to oppose said rotation of the latter.

19. In a power steering gear for an automotive vehicle, a rockshaft adapted to be connected with a steering linkage to operate the same upon pivoting of said rockshaft, a housing having said rockshaft pivotally supported therein, a sector gear at one end of said rockshaft and pivotal therewith, a reciprocable gear rack having teeth meshed with the teeth of said sector gear to pivot the latter upon reciprocation of said rack, the meshing teeth of said gear rack and sector gear meeting along a taper effective to increase the snugness of engagement therebetween upon axial movement of said rockshaft in one direction with respect to said rack, resilient means yieldingly urging said rockshaft in said one direction, a wear washer seated against a portion of said rockshaft to oppose axial movement of the latter in said one direction, and means for adjusting the axial position of said wear washer to effect a predetermined play between said meshing teeth, the material of said washer being determined to effect a predetermined rate of wear of said washer sufficient to enable axial shifting of said rockshaft upon wearing of said teeth to minimize play therebetween.

20. In a power steering gear, a rotatable worm gear connectible with a steering linkage and having a tubular extension, fluid actuated means operably coupled with said worm gear to rotate the same, valve means in a fluid circuit selectively operable to actuate said fluid actuated means for rotating said worm gear in one direction or the other, said valve means including a sleeve fitting snugly within said tubular extension and having a plurality of axially spaced ports therein, each port comprising a plurality of windows extending circumferentially in said sleeve, said valve means also including a valve spool reciprocable in said sleeve and having land and groove portions for selectively interconnecting said ports, said fluid circuit also including a separate fluid passage registering with each port and extending radially through said tubular extension.

References Cited in the file of this patent

UNITED STATES PATENTS

| | | |
|---|---|---|
| 191,848 | Gorman | June 12, 1877 |
| 2,917,938 | Folkerts | Dec. 22, 1959 |
| 2,773,396 | Haynes | Dec. 11, 1956 |
| 2,854,955 | Be Vier | Oct. 7, 1958 |
| 2,865,216 | Bishop | Dec. 23, 1958 |
| 2,917,938 | Folkerts | Dec. 22, 1959 |